United States Patent [19]

Beebe

[11] Patent Number: 4,815,004

[45] Date of Patent: Mar. 21, 1989

[54] APPARATUS AND METHOD FOR PREDICTING FORE/AFT FORCES GENERATED BY TIRES

[75] Inventor: James C. Beebe, Medina, Ohio

[73] Assignee: Eagle-Picher Industries, Inc., Cincinnati, Ohio

[21] Appl. No.: 920,247

[22] Filed: Oct. 17, 1986

[51] Int. Cl.[4] ............................................. G01M 17/02
[52] U.S. Cl. ...................... 364/506; 364/576; 364/508; 73/146; 73/8; 73/146.5; 377/17
[58] Field of Search ............... 73/146, 8, 462, 146.5; 364/576, 506, 507, 552, 508; 340/58; 377/17

[56] References Cited

U.S. PATENT DOCUMENTS

| Re. 28,775 | 3/1976 | Tarpinian et al. | 73/146 |
|---|---|---|---|
| 3,490,277 | 1/1970 | Sanders et al. | 364/508 |
| 3,495,079 | 2/1970 | Halawa et al. | 364/508 |
| 3,527,103 | 9/1970 | Hale et al. | 73/462 |
| 3,719,813 | 3/1973 | Friedman et al. | 364/506 |
| 4,004,450 | 1/1977 | Yaksin et al. | 364/508 |
| 4,018,087 | 4/1977 | Wenz | 364/508 |
| 4,169,371 | 10/1979 | Witschi et al. | 364/551 |
| 4,311,044 | 1/1982 | Marshall et al. | 364/507 |
| 4,366,707 | 1/1983 | Jarschel | 73/462 |
| 4,442,499 | 4/1984 | Sekula et al. | 364/576 |
| 4,479,382 | 10/1984 | Greenhorn et al. | 73/146 |
| 4,494,400 | 1/1985 | Hill | 73/462 |
| 4,691,564 | 9/1987 | Potts et al. | 7/146 |

OTHER PUBLICATIONS

Gerald R. Potts, "High Speed Tire Uniformity Testing", Date Unknown, 10/15/85.

Primary Examiner—P. S. Lall
Assistant Examiner—Ellis B. Ramirez
Attorney, Agent, or Firm—Wood, Herron & Evans

[57] ABSTRACT

An apparatus and method for predicting fore-aft translations of tires. An inflated tire is rotated at a nominally constant angular velocity against a freely rotatable rigid loadwheel under a radial load. Changes in the instantaneous effective radius of the tire as it rolls give rise to fore/aft forces which tend to translate the tire alternately forward, toward the direction of travel and aft, toward the opposite direction. The tendency of the tire to so translate is predicted by measuring variations in effective radius or a parameter correlated thereto such as changes in the motion of the tread surface of the tire or the loadwheel relative to the angular speed of the tire.

21 Claims, 2 Drawing Sheets

APPARATUS AND METHOD FOR PREDICTING FORE/AFT FORCES GENERATED BY TIRES

FIELD OF THE INVENTION

The present invention relates generally to testing tires. More particularly, the invention relates to a method and apparatus for predicting, even at low test speeds, the tendency of tires to generate fore and aft forces as they roll. As will be explained in further detail below, tires generate fore/aft forces which vary in magnitude and direction with the rotational position of the tire. These forces tend to translate the tire alternately forward, toward the direction of travel and aft, toward the opposite direction.

BACKGROUND OF THE DISCLOSURE

It is well recognized that tires influence a number of performance characteristics of a vehicle such as traction and ride. "Ride" is a broad term used to describe the manner in which a vehicle carries its occupants. A vehicle which "rides well" is one which is relatively free of annoying factors such as continual or intermittent vibration, noise and steering disturbances.

As a tire rolls under load along a surface such as a roadway, structural nonuniformities give rise to self-excited reaction forces which vary with the rotational angle of the tire. In fairly uniform tires, the magnitudes of these force variations are sufficiently small that their effects are imperceptible to the driver and passengers. In less uniformly constructed tires, force variations can degrade the ride of a vehicle to a point of unacceptability. As vehicles, particularly automobiles have been reduced in weight to improve fuel economy, the effects of tire reaction forces have become increasingly apparent.

For these reasons, auto makers and distributors of replacement or "after market" tires insist that the tires they purchase fall within prescribed limits as to force variations. Typically, maximum force limits are specified in terms of one or more of the harmonic components of the Fourier series describing the force as an instantaneous function. Since tires cannot yet be manufactured with the degree of uniformity required to always maintain force variations within acceptable limits, it is important to have the ability to measure various types of force variation so that tires with excessive force variation can be subjected to corrective action or if need be, rejected. It is common practice to evaluate tire behavior using a tire uniformity inspection machine.

In a typical uniformity inspection machine, tires are fed by conveyor to a test station where each tire is mounted upon a chuck, inflated, and rotated while its tread surface is urged radially against the circumferential surface of a loadwheel. The loadwheel is a rigid structure which rotates freely due to its engagement with the tire along an axis of rotation parallel to that of the tire. After the distance between the centers of the tire and loadwheel are adjusted to place a desired average radial load on the tire, the distance between the center distance is held fixed for the remainder of the test. Load cells or strain gauges mounted to the loadwheel spindle in appropriate orientations then measure the reaction forces exerted by the tire on the loadwheel.

Study has shown that several types of force variations occur simultaneously as an inflated tire rolls under load. One type of force variation routinely checked by tire manufacturers is radial force variation. In a uniformity inspection machine, radial forces are directed along a line between the centers of the tire and loadwheel. In a moving vehicle, radial forces are directed vertically between the center of the tire to the road surface. Tires having excessive radial force variation cause vibration and generally impair the ride of the vehicle on which they are mounted. Another parameter of interest measured on a uniformity inspection machine is lateral force. Lateral force is measured along the axis of rotation of the tire and determines the tendency of the tire to vibrate side to side.

Over the past several years auto manufacturers have been receiving peculiar complaints concerning vehicle ride. At times, the steering wheels of affected vehicles oscillate back and forth, an effect which has been termed "nibble". When nibble occurs, the driver and sometimes the passengers feel vibration. Complaints of nibble may result in a new car being returned one or more times to the dealer for corrective action. Handling such complaints is enormously costly to auto manufacturers in terms of warranty repair costs and lost customer good will.

Nibble is puzzling in that affected cars do not exhibit the effect all the time or even at a specific speed or range of speeds. Once nibble starts, it may disappear quickly or last an entire trip. Although tire/wheel imbalance may give rise to vibrations resembling those caused by nibble, nibble occurs in cases where neither excessive imbalance nor radial nor excessive lateral force variation are present. When wheel balancing or other measures fail to eliminate a vibration problem, replacing the tires is often successful. Efforts to link nibble to sources in the vehicle other than tires have been largely without success. Therefore, auto manufacturers and tire builders have been attempting to relate nibble to a characteristic of tires which can be measured. Once this is done, standards can be established so that measurements made by different tire manufacturers on different tire uniformity test machines can be used to predict nibble and reject offending tires before complaints arise.

It has been suspected that some tires give rise to fore-/aft force variations which cause nibble. Fore/aft forces are reaction forces generated by a tire rolling under load as it interacts with the road surface. The magnitude and direction of the fore/aft force varies with the rotational position of the tire so that the force tends to translate the tire alternately forward, toward the direction of travel and aft, toward the opposite direction. This theory agrees well with the observed characteristics of nibble.

Fore/Aft motion of a front tire would be transmitted back through the steering mechanism in a way tending to cause rotational oscillation of the steering wheel. If both front tires exhibit fore/aft movement, their fore-/aft motion will be in phase or out of phase to some degree. When both front wheels are completely in phase so that both tires move forward and backward together, the tendencies of the tires to oscillate the steering wheel will tend to cancel so that nibble will be at a minimum. On the other hand, nibble will be most noticeable when the tires are completely out of phase so that the effects of their fore/aft motion is additive at the steering wheel. This would account for the fact that nibble is only apparent intermittently.

The perception thresholds for nibble complaints can be established empirically with tires of known characteristics. It follows that if nibble is caused by fore/aft forces, measurements of fore/aft force can be used to predict whether a given tire will result in a nibble complaint when it is mounted on a vehicle. However, since fore/aft forces are small at the low test speeds at which uniformity testing is generally conducted, it has been necessary to test tires at highway speed to measure fore/aft forces with acceptable accuracy. High speed testing is undesirable among others reasons, because of the relatively long time required to accelerate the tire to test speed. Since high speed testing must be conducted on specially designed high speed test equipment, a separate test station is required. It would be highly desirable therefore to predict fore/aft forces at low test speed so that fore/aft force prediction could be integrated with other force variation measurements in a single test sequence. Yet, previous efforts to predict fore/aft translations by attempting to measure fore/aft force at low test speeds have been largely without success.

The technique used has been to equip either the tire spindle or the loadwheel spindle of a tire uniformity machine with a strain gauge or load cell oriented in the fore/aft direction so that the load cell reports directly in force units. While such force measurements, taken on a given uniformity machine, are useful to rank a group of tires in terms of their relative predispositions to cause nibble, there is not good agreement of measured force values from one similarly instrumented uniformity machine to the next. Therefore, it has not been previously possible to establish a universal specification figure which can be used to relate fore/aft force to empirically determined perception thresholds at which nibble complaints can be expected.

SUMMARY OF THE INVENTION

The force measured according to the prior art techniques discussed above is not the true fore/aft force. While the measured force is related to the fore/aft force, it also depends upon the characteristics of the particular tire uniformity inspection machine on which the test is run. In particular, the measured force depends upon the polar moment of inertia of the instrumented rotating assembly, be it the loadwheel and the spindle driving it or the tire/rim assembly and its spindle. Also, such measurements are speed dependant. The force reported by a load cell mounted on the loadwheel spindle varies with the square of the speed of the loadwheel. This creates two problems. First, since the tire rotates at a nominally constant angular speed in a uniformity inspection machine, the speed of the loadwheel will vary with tire size. Secondly, tire uniformity machines generally test at low speed. This keeps the test cycle time short by avoiding the need to wait for the tire to accelerate to and decelerate from highway speed. However, because the fore/aft force increases with the square of speed, values measured at conventional, low test speeds are only a fraction of the force expected at highway speeds. In present test machines, accuracy is limited by the ability of the system to resolve relatively small differences in measured force. All of these factors tend to impair the usefulness of measurements made with prior art techniques.

Accordingly, it is an object of the present invention to provide an apparatus and method for predicting the tendency of tires to translate due to fore/aft force variations without the use of load cells, strain gauges or similar devices that measure force directly.

It is also an object of this invention to provide such an apparatus and method which defines the tendency of a tire to translate in the fore/aft direction as it rolls under load according to a specification figure which is substantially independent of tire radius, test speed, and the polar moments of inertia of rotating members associated with the test machine.

It is another object of this invention to provide such an apparatus and method which can be adapted for use with new test equipment or readily retrofitted to upgrade existing tire uniformity inspection equipment.

It is a further object of the present invention to provide such an apparatus and method which operate at conventional, low test speeds as not to significantly increase the cycle time of a uniformity inspection machine.

It is a still further object of this invention to provide such an apparatus and method which include novel means for calibration.

The present invention provides a method and apparatus for predicting fore/aft force translations of tires whereby the tire is inflated and rotated by a drive mechanism. A freely rotatable, rigid loadwheel whose axis of rotation is parallel to that of the tire is urged against the tread surface of the tire to provide a desired radial load on the tire so that the loadwheel rotates with the tread surface of the tire.

The invention is based on the premise that fore/aft translations stem from changes in the instantaneous effective radius of the tire under test. Changes in instantaneous effective radius are intrinsic characteristics of the tire itself which are shown to be directly related to fore/aft force.

In a first preferred embodiment of the invention, the tendency of a tire to translate fore and aft is defined in terms of one or more of the coefficients of the Fourier series describing the measured changes in effective radius. The instantaneous effective radius is computed from the signals emanating from a pair of shaft encoders mounted to rotate synchronously with the tire spindle and loadwheel spindle respectively.

In a second preferred embodiment of the invention, it is recognized that instantaneous changes in the effective radius of the tire, cause corresponding changes in the speed of its tread surface relative to its angular speed. These changes are imparted to the motion of the loadwheel, as it rotates in contact with the tire. The angular acceleration of the loadwheel is used to predict fore/aft translations of the tire. The tire is driven at a precisely controlled, constant angular speed so that any changes in the angular velocity of the loadwheel may be assumed to be due to changes in the effective radius of the tire. The angular acceleration of the loadwheel is computed from the signals emanating from a single shaft encoder connected to rotate synchronously with the loadwheel.

DETAILED DESCRIPTION OF THE INVENTION

Figure 1:
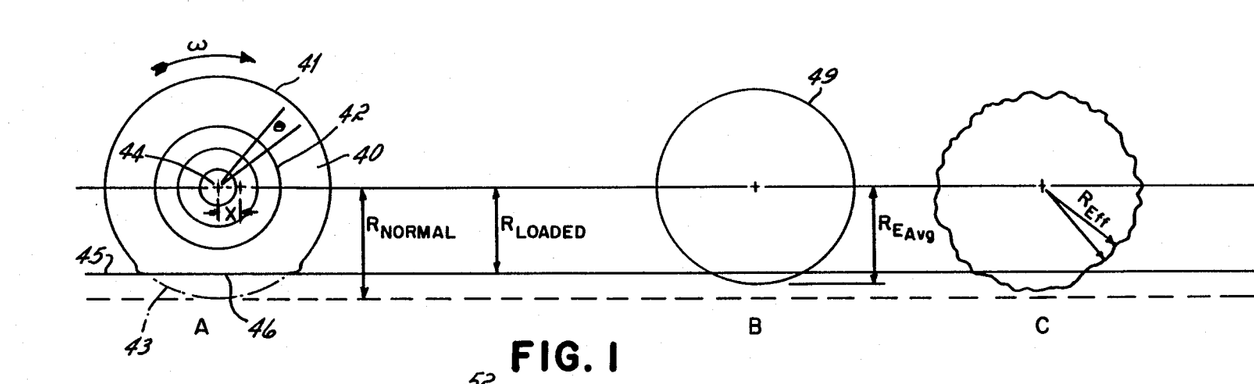
FIG. 1 is a schematic diagram illustrating in exaggerated detail the differences between the normal, unloaded radius of a tire, its loaded radius, its average effective radius and its instantaneous effective radius.

FIG. 1 at A shows a fully inflated tire 40 having a tread surface 41 mounted on a rim 42. In an unloaded condition, as when the tire 40 is not supporting a vehicle, the profile of tire 40 is defined by the dotted circular line 43 which has a normal radius, $R_{Normal}$, measured from the center 44 of the tire 40 and rim 42 assembly. When tire 40 is placed under a radial load, as when supporting the weight of a vehicle on a surface 45, the bottom portion 46 of tire deforms so that $R_{Loaded}$, which is the distance from center 44 to surface 45 is smaller than the unloaded, normal radius, $R_{Normal}$. Accordingly, the distance around the tread surface 41 decreases as tire 40 is loaded so that tire 40 must roll more times when loaded to cover the same distance along surface 45 as when tire 40 is unloaded. However, as tire 40 rolls under load, it does not cover the same distance along surface 45 as would a round wheel of radius $R_{Loaded}$. When loaded, tire 40 actually rolls further than would a round wheel of radius $R_{Loaded}$. An imaginary, perfectly round circle 49 of radius, $R_{EAvg}$ can be constructed as shown at B in FIG. 1 such that for given number of revolutions, circle 49 and loaded tire 40 will each travel the same distance along surface 45. $R_{EAvg}$ thus defines the average effective radius of tire 40 under given conditions of inflation and radial load.

While the effective radius of a loaded tire 40 can be expressed as an average figure $R_{EAvg}$, it is significant that the instantaneous effective radius, $R_{Eff}$, is not constant over the circumference of tire 40 as is illustrated schematically at C in FIG. 1. The instantaneous effective radius, $R_{Eff}$, varies with the rotational position of tire 40 in a manner which repeats over each complete rotation as a periodic function.

It will be shown that fore/aft force variations are directly related to changes in the instantaneous effective radius, $R_{Eff}$, of an inflated tire 40 rolling under a radial load. Accordingly, fore/aft translations of tire 40 can be predicted by measuring variations in $R_{Eff}$, or some other parameter correlated directly thereto. Preferably, the figure of merit defining the tendency of a tire 40 to cause nibble is selected to be one or more Fourier coefficients of the Fourier series describing such a parameter.

Referring again to A of FIG. 1, the instantaneous effective radius, $R_{Eff}$, of a tire 40 rolling under a radial load on a surface 45 can be defined as the linear distance, x, traveled by tire 40 along surface 45 per unit of angular rotation, $\theta$. From this definition, it will be understood that for a small angle of rotation, $d\theta$, the tire 40 will advance a corresponding distance, dx along surface 45 such that:

$$R_{Eff} = \frac{dx}{d\theta}: \quad \text{Equation 1}$$

or:

$$dx = R_{Eff} d\theta: \quad \text{Equation 2}$$

$R_{Eff}$ can be expressed as:

$$R_{Eff} = R_{EAvg} + \sum_{i=1}^{\infty} U_i \sin(i\theta + \phi_i): \quad \text{Equation 3}$$

where:

$R_{EAvg}$ is a constant representing the average or D.C. component of effective radius shown at B in FIG. 1;

$U_i$ is the ith Fourier coefficient (otherwise known as the half peak amplitude of the ith harmonic) of the change in effective radius, $R_{Eff}$ per revolution of tire 40 and $\theta_i$ is the phase shift of the ith harmonic.

The series summation term of Equation 3 is the Fourier series describing the change or A.C. component of $R_{Eff}$. This term represents the difference between the instantaneous value, $R_{Eff}$, and the average component $R_{EAvg}$ of effective radius as shown in FIGS. 1B and 1C, respectively.

Substituting Equation 3 into Equation 2, we have:

$$dx = R_{EAvg} d\theta + \sum_{i=1}^{\infty} U_i \sin(i\theta + \phi_i) d\theta: \quad \text{Equation 4}$$

Where tire 10 rotates at a nominally constant angular velocity, $$D\theta = \omega dt \quad \text{Equation 5:}$$

Substituting Equation 5 into Equation 4, we have:

$$dx = R_{EAvg} \omega dt + \sum_{i=1}^{\infty} U_i \sin(i\omega t + \phi_i) dt: \quad \text{Equation 6}$$

Differentiating Equation 6 with respect to time to obtain the velocity, $V_T$ of the tread surface 41 of the tire 40.

$$v_T = \omega R_{EAvg} + \omega \sum_{i=1}^{\infty} U_i \sin(i\omega t + \phi_i): \quad \text{Equation 7}$$

Differentiating Equation 7 to obtain the acceleration, $a_T$, of the tread surface 41 of tire 40:

$$a_T = \omega^2 \sum_{i=1}^{\infty} i U_i \cos(i\omega t + \phi_i): \quad \text{Equation 8}$$

Figure 2:
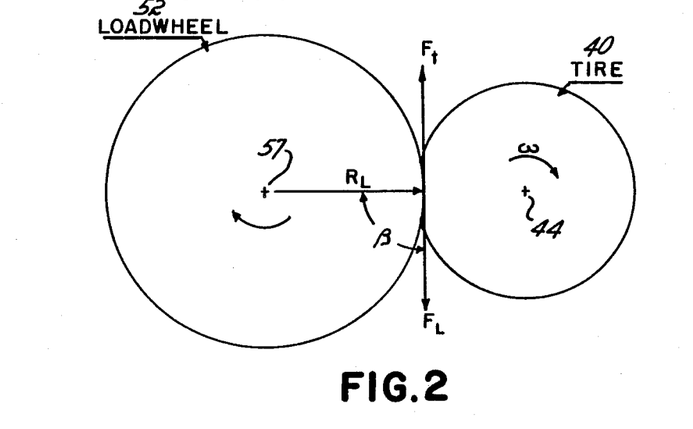
FIG. 2 is a force diagram of a tire rotating in forced radial contact with a rigid loadwheel.

Referring now to FIG. 2, the tread surface 41 of tire 40 rotates in forced contact with the circumferential surface 51 of a freely rotatable, rigid loadwheel 52 of radius, $R_L$, which rotates in the opposite direction due to its constant with tire 40. The radial load on tire 40 must be sufficiently great that there is no net slip between the tread surface 41 of tire 40 and the circumferential surface 51 of loadwheel 52 so that the tread surface 41 of tire 40 transmits an acceleration, $a_L$, to the circumferential surface 51 of loadwheel 52 which is equal in magnitude to the acceleration, $a_T$, of the tread surface 41 of tire 40 as given by Equation 8, so that:

$$|a_L| = |a_T| \quad \text{Equation 9:}$$

The angular acceleration, $\alpha_L$, of loadwheel 52 is given by:

$$\alpha_L = \frac{a_L}{r}: \quad \text{Equation 10}$$

Substituting Equations 8 and 9 into Equation 10:

$$\alpha_L = \frac{\omega^2}{r} \sum_{i=1}^{\infty} i U_i \cos(i\omega t + \phi_i): \quad \text{Equation 11}$$

Assuming loadwheel 52 has a polar moment of inertia, I, the torque, $\tau$ required to accelerate loadwheel 52 by angular acceleration $\alpha_L$ is given by:

$$\tau = I\,\alpha_L \qquad \text{Equation 12:}$$

Substituting Equation 11 into Equation 12:

$$\tau = \frac{I\omega^2}{r} \sum_{i=1}^{\infty} iU_i\text{Cos}(i\omega t + \phi_i): \qquad \text{Equation 13}$$

Generation of torque, $\tau$ requires a force, $F_L$ acting on loadwheel 52 at radius $R_L$ given by:

$$F_L = \frac{\tau}{R_L \text{Sin}\beta}: \qquad \text{Equation 14}$$

where $\beta$ is the angle between radius, $R_L$ and the force, $F_L$. Since $F_L$ acts perpendicular to the radius, $R_L$ of loadwheel 52, $$\text{Sin }\beta = 1 \qquad \text{Equation 15:}$$

$F_L$ is a reaction force which is by definition equal and opposite to the fore/aft force, $F_T$ generated by tire 40 as it rolls under load so that:

$$|F_T| = |F_L| \qquad \text{Equation 16:}$$

Substituting Equations 13, 15 and 16 into Equation 14, we find:

$$F_T = \frac{I\omega^2}{r} \sum_{i=1}^{\infty} iU_i\text{Cos}(i\omega t + \phi_i): \qquad \text{Equation 17}$$

By inspection, we note that fore/aft force $F_T$ is shown by Equation 17 to vary with the polar moment of inertia, I, and radius, r, of the loadwheel 51 as well as with the angular speed $\omega$ of the tire 40 under test. On the other hand, fore/aft force, $F_T$, is directly related to changes in the instantaneous effective radius $R_{Eff}$ of tire 40 as given by the series summation term of Equation 3. $R_{Eff}$ is an intrinsic characteristic of tire 40 which does not depend on the above characteristics of the test apparatus.

From the above discussion it can be appreciated that changes in the effective radius of tire 40 are reflected in corresponding changes in the motion of its tread surface 41. These changes are in turn transmitted to the motion of loadwheel 52. Accordingly, the tendency of tire 40 to translate due to fore/aft forces may be specified according to measured changes in $R_{Eff}$ or any other parameter correlated thereto, including but not limited to, the angular acceleration of loadwheel 52 relative to that of tire 40 or changes in the speed of the tread surface 41 of tire 40 relative to its angular speed.

FIRST PREFERRED EMBODIMENT

Figure 3:
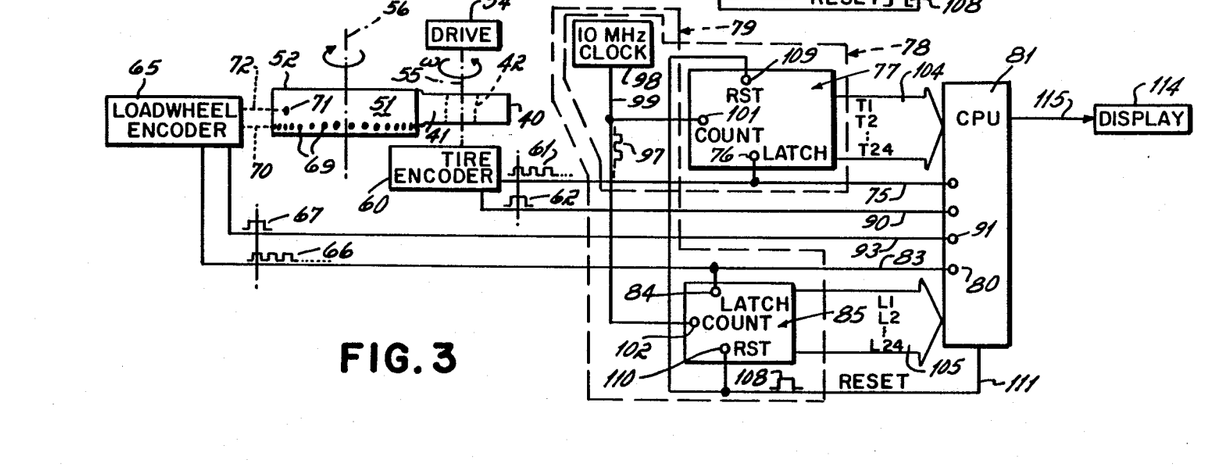
FIG. 3 is a schematic block diagram of the apparatus of a first preferred embodiment of the invention.

A first preferred embodiment of the invention can be further understood with reference to FIG. 3. An inflated tire 40 having a tread surface 41 is mounted on a rim 42 which is rotatably connected to a drive mechanism 54 by a tire spindle 55 whose axis passes through the center 44 of the rim 42. Drive 54 causes tire 40 to rotate at nominally constant angular velocity, $\omega$. A rigid loadwheel 52 of radius, $R_L$, having a circumferential surface 51 is freely rotatably mounted on a loadwheel spindle 56 whose axis passes through the center 57 of the loadwheel 52 and is parallel with the axis of tire spindle 55. Rim 42 is positionable so that the tread surface 41 of tire 40 can be brought into forced radial contact with the circumferential surface 51 of loadwheel 53 so that loadwheel 52 rotates due to its engagement with tire 40.

A tire encoder 60 is connected by way of tire spindle 55 to rotate synchronously with tire 40 to sense its motion. Tire encoder 60 is an electro-mechanical device which generates a plurality of nominally evenly angularly spaced electrical tire encoder pulses 61 and a single tire reference pulse 62 for each revolution of tire 40. Tire reference pulse 62 occurs in a fixed rotational position with respect to tire 40 as well as with respect to each tire encoder pulse 61. Therefore, each tire encoder pulse 61 specifies a unique rotational position of tire 40 which can be identified by numbering the position of each tire encoder pulse 61 with respect to the tire reference pulse 62. Tire encoder 60 preferably comprises a shaft encoder such as model Part No. ILC-SUM-128-5-SE-A-6A manufactured by Motion Control Devices of Lowell, Mass. which produces 128 tire encoder pulses 61 and a single tire reference pulse 62 per revolution. Many existing tire uniformity inspection machines already include a shaft encoder which rotates with the tire 40 under test and which may conveniently be used as tire encoder 60.

In a similar fashion, a loadwheel encoder 65 is connected to sense the motion of loadwheel 52. Loadwheel encoder 65 generates the same number of nominally evenly angularly spaced loadwheel encoder pulses 66 for each revolution of loadwheel 52 as does tire encoder 60 for each revolution of tire 40. Once each revolution of loadwheel 52, loadwheel encoder 65 generates a loadwheel reference pulse 67 which represents a particular rotational position of loadwheel 52 such that each loadwheel encoder pulse 66 specifies a unique rotational position of loadwheel 52 which can be identified by numbering the position of each loadwheel encoder pulse 66 with respect to the loadwheel reference pulse 67.

Loadwheel encoder 65 may comprise the same type of shaft encoder as preferred for use as tire encoder 60. However, existing tire uniformity inspection machines do not usually have a shaft encoder driven by loadwheel 52. In such cases, a loadwheel encoder 65 is conveniently constructed by drilling the proper number of nominally equally angularly spaced holes 69 about the circumferential surface 51 of loadwheel 52 and sensing holes 69 by optical means 70 to generate loadwheel encoder pulses 66. A single hole 71 located at a different lateral location on the circumferential surface 51 of loadwheel 52 is sensed by second optical means 72 to generate loadwheel reference pulse 67.

Tire encoder pulses 61 emanating from tire encoder 60 are carried by line 75 and received by the latch input 76 of a first 24 bit latched binary counter 77 as well as by a first interrupt port 80 of a central processing unit, CPU 81, which operates according to a software program stored in memory as will be described in further detail below. Loadwheel encoder pulses 66 are carried by a line, 83 and received by the latch input 84 of a second 24 bit latched, binary counter 85 as well as by a second interrupt port 88 of CPU 81. Tire reference pulses 62 are carried by line 90 to a first status port 91 of CPU 81 while loadwheel reference pulses 67 are carried by line 93 to a second status port 94 of CPU 81.

Both latched counters 77,85 operate as timers 78 and 79, respectively, by counting clock pulses 97 received from a 10 MHz, free running clock 98 on clock line 99 at their respective count inputs 101 and 102. The outputs 104 and 105 of each latched counter 77,85 comprise 24 bit data words $T_1$-$T_{24}$ and $L_1$-$L_{24}$, respectively, which are made available to the data bus of CPU 81. Outputs 104 and 105 are cleared by a reset pulse 108 generated by CPU 81 and carried to corresponding reset pins 109 and 110 by way of reset line 111. CPU 81 communicates with a display 114 by way of a cable 115.

In operation, a tire 40 to be tested is mounted on rim 42, inflated and rotated at a nominally constant angular speed, $\omega$ by drive 54. Rim 42 is positioned so that the tread surface 41 of tire 40 is urged into contact with the circumferential surface 51 of loadwheel 52 to establish a predetermined average radial load on tire 40. Once this load is set, the distance between the center 44 of rim 42 and the circumferential surface 51 of loadwheel 52 is held fixed. After steady state motion of tire 40 and loadwheel 52 is established, a reset pulse 108 is generated by CPU 81 on reset line 111 to clear and thereby synchronize both latched counters 77 and 85. Latched counters 77 and 85 then begin to count up in response to clock pulses 97 received from clock 98 so that both latched counters 77 and 85 contain identical 24 bit binary values representing units of time.

The software program stored in CPU 81 polls status port 94, testing for the presence of a loadwheel reference pulse 67 there. As previously noted, loadwheel reference pulse 67 uniquely identifies one rotational position of loadwheel 52. The rotational angle, $A_L(n_L)$, between each pair of adjacent loadwheel encoder pulses 65 is available from the memory of CPU 81, having been stored there as a result of the calibration routine described later.

The rotational position of loadwheel 52 at each loadwheel encoder pulse 66 is identified by the software program of CPU 81 by counting the incremental number, $n_L$, of loadwheel encoder pulses 66 following a loadwheel reference pulse 67.

As each successive loadwheel encoder pulse 66 appears on line 83, CPU 81 records the time of its occurrence by reading the present 24 bit binary value, $L_1$-$L_{24}$, from the output 105 of second latched counter 85 and storing this value in its memory. After so reading 128 consecutive loadwheel encoder pulses 66, corresponding to one complete revolution of loadwheel 52, CPU 81 reads and records the time of the next two loadwheel encoder pulses 66 for a purpose which will be explained below, so that the times of occurrence of a total of 130 consecutive loadwheel encoder pulses 65 are read and stored in the memory of CPU 81.

CPU 81 calculates the speed of the circumferential surface 51 of loadwheel 52 at the time, $T_L(n_L)$, of each of the 128 loadwheel encoder pulses 66 corresponding to one complete revolution of loadwheel 52. The instantaneous speed $V_L(n_L)$ at each encoder pulse position, $n_L$, is approximated by CPU 81 dividing the difference in time between the immediately previous loadwheel encoder pulse 66 and the next subsequent loadwheel encoder pulse 66 into the distance along the circumferential surface 51 of loadwheel 52 corresponding to those two loadwheel encoder pulses. This gives the equation:

$$V_L(n_L) = \frac{R_L A_L(n_L)}{2\pi T_L(n_L)} \qquad \text{Equation 18}$$

where:

$V_L(n_L)$ is an approximation of the instantaneous circumferential velocity of loadwheel 52 at the time of occurrence of the $n_L{}^{th}$ loadwheel encoder pulse 66 following a loadwheel reference pulse 67;

$R_L$ is the radius of loadwheel 52, a constant whose value is stored in the memory of CPU 81;

$A_L(n_L)$ is the angle of the $n_L{}^{th}$ loadwheel encoder pulse 66 and is defined as:

$$A_L(n_L) = A_L(n_L+1) - A_L(n_L-1) \qquad \text{Equation 19:}$$

where:

$A_L(n_L+1)$ is the angular distance between the loadwheel reference pulse 67 and the $(n_L+1)^{th}$ loadwheel encoder pulse 65 and $A_L(n_L-1)$ is the angular distance between the loadwheel reference pulse 67 and the $(n_L-1)^{th}$ loadwheel encoder pulse 65 and $T_L(n_L)$ is the time of occurrence of the $n_L$ loadwheel encoder pulse 65 and is defined as:

$$T_L(n_L) = T_L(n_L+1) - T_L(n_L-1) \qquad \text{Equation 20:}$$

where:

$T_L(n_L+1)$ is the time of occurrence of the $(n_L+1)^{th}$ loadwheel encoder pulse 65 and $T_L(n_L-1)$ is the time of occurrence of the $(n_L-1)^{th}$ loadwheel encoder pulse 65.

It can be observed from inspection of equation 20 that since one complete revolution of loadwheel 52 corresponds to 128 loadwheel encoder pulses 66, CPU 81 must read and record data for a total of 130 loadwheel encoder pulses 66, numbered 0 through 129, in order to calculate circumferential velocities, $V_L(n_L)$ for $n_L = 1$ to 128. By solving equation 18, CPU 81 constructs a table in its memory relating the time $T_L(n_L)$ of each loadwheel encoder pulse 66, $n_L$ to the corresponding values of $V_L(n_L)$ as follows:

TABLE 1

| Time, $T_L(n_L)$ | $V_L(n_L)$ |
|---|---|
| $T_L(1)$ | $V_L(1)$ |
| $T_L(2)$ | $V_L(2)$ |
| $T_L(3)$ | $V_L(3)$ |
| . | . |
| . | . |
| $T_L(128)$ | $T_L(128)$ |

As Table 1 is generated, the software program stored in CPU 81 also polls status port 91, testing for the presence of a tire reference pulse 62 on line 90. When the next tire reference pulse 62 appears, CPU 81 responds by reading onto its data bus the present binary value, $T_1$-$T_{24}$, latched at the output 104 of first latched counter 77 and storing this value in its memory. The time, $T_T(n_T)$, of each subsequent tire encoder pulse 61 is read and recorded in a like manner. As with loadwheel encoder pulses 66, the time of occurrence of 130 tire encoder pulses 61 numbered 0 through 129 are read and stored by CPU 81. The nominal rotational angles, $A_T(n_T)$ of tire encoder pulses 61 are available in the memory of CPU 81 so that the rotational position of tire 40 at the time $T_T(n_T)$ each tire encoder pulse 61 occurs can be identified by CPU 81 by counting the number of tire encoder pulses 61 following tire reference pulse 62.

The speed, $V_T(n_T)$ of the tread surface 41 of tire 40 is calculated by CPU 81 by modeling loaded tire 40 as a wheel of unknown and varying instantaneous effective radius, $R_{Eff}$. By a derivation similar to that of equation 18, we have:

$$V_T(n_T) = \frac{R_{Eff} A_T(n_T)}{2\pi T_T(n_T)} \qquad \text{Equation 21}$$

where:

$V_T(n_T)$ is an approximation of the instantaneous speed of the tread surface of tire 40 at the time of occurrence of the $n_T{}^{th}$ tire encoder pulse 61 following a tire reference pulse 62;

$R_{Eff}$ is the instantaneous effective radius of tire 40 as defined above;

$A_T(n_T)$ is the angle of the $n_T{}^{th}$ tire encoder pulse a constant, stored in the memory of CPU 81. $A_T(n_T)$ is defined as:

$$A_T(n_T) = A_T(n_T+1) - A_T(n_T-1)$$

where:

$A_T(n_T+1)$ is the angular distance between the tire reference pulse 62 and the $(n_T+1)^{th}$ tire encoder pulse 61 and $A_T(n_T-1)$ is the angular distance between the tire reference pulse 62 and the $(n_T-1)^{th}$ tire encoder pulse 61.

$T_T(n_T)$ is the time of occurrence of $n_T{}^{th}$ tire encoder pulse 61 and is defined as:

$$T_T(n_T) = T_T(n_T+1) - T_T(n_T-1) \qquad \text{Equation 23:}$$

where:

$T_T(n_T+1)$ is the time of occurrence of the tire encoder pulse 61 and $T_T(n_T-1)$ is the time of occurrence of the $(n_t-1)^{th}$ tire encoder pulse 61.

Solving equation 21 for $R_{Eff}$, $$R_{Eff} = \frac{2\pi V_T(n_T) T_T(n_T)}{A_T(n_T)} \qquad \text{Equation 24}$$

Since the tread surface 41 of tire 40 rotates in forced engagement with the circumferential surface 51 of loadwheel 52 the speeds of these two surfaces 41,52 are assumed to be equal at all relevant times. Accordingly, the values $V_L(n_L)$ of the circumferential surface 51 of loadwheel 52 determined from equation 18 and stored in table 1 are substituted for each corresponding term, $V_T(n_T)$ of equation 24 so that equation 24 may be rewritten as:

$$R_{Eff} = \frac{2\pi V_L(n_L) T_T(n_T)}{A_T(n_T)} \qquad \text{Equation 25}$$

Noting that the instantaneous angular speed, S of tire is given by:

$$S = \frac{A_T(n_T)}{T_T(n_T)}, \qquad \text{Equation 26}$$

equation 25 may be expressed as:

$$R_{Eff} = \frac{2\pi V_L}{S} \qquad \text{Equation 27}$$

However, the tire encoder pulses 61 and the loadwheel encoder pulses 66 are not synchronized so that each term $V_T(n_T)$ may not represent velocities at the same moments in time as the values $V_L(n_L)$ stored in table 1.

To minimize the effect of this problem, the software program stored in CPU 81 locates from table 1 that value of loadwheel circumferential velocity, $V_L(n_L)$ for the time $T_L(n_L)$ closest in time to time $t_T(n_T)$ and uses that value for $V_L(n_L)$ in equation 25. With that substitution complete, CPU 81 solves equation 27 for effective radius $R_{Eff}$ and stores the computed value in its memory. This procedure is repeated for each tire encoder pulse 61 until CPU 81 has constructed a second table in its memory which represents the calculated value of $R_{Eff}$ for each tire encoder pulse, $n_T$, as follows:

TABLE 2

| Tire Encoder Pulse Position, $n_T$ | Instantaneous Effective Radius, $R_{Eff}(n_T)$ |
|---|---|
| 1 | $R_{Eff}(1)$ |
| 2 | $R_{Eff}(2)$ |
| 3 | $R_{Eff}(3)$ |
| . | . |
| . | . |
| . | . |
| 128 | $R_{Eff}(128)$ |

Table 2 represents the instantaneous effective radius, $R_{Eff}$ of tire 40 at each of a plurality of nominally equally angularly spaced locations ($n_T$) around its tread surface 41 under a predetermined average radial load. As demonstrated above, $R_{Eff}$ is an intrinsic property of tire 40. Further, changes in effective radius are directly related to the fore/aft force, generated by tire 40 as it rolls under load and do not depend on such factors as test speed, loadwheel radius or the polar moment of inertia of the loadwheel 52. Accordingly, the data of table 2 is useful to predict fore/aft translations of tire 40 which may result in nibble when tire 40 is mounted on a vehicle.

In light of the preceding disclosure, it will be obvious to one skilled in the art that the data of table 2 may be processed by CPU 81 or external means in a variety of ways to define a figure of merit specifying the tendency of a tire 40 to translate fore and aft. For example, values of peak to peak or RMS variations in $R_{Eff}$ may be specified as limits. Preferably, however, software program stored in CPU 81 subjects the data of Table 2 to Fourier analysis as may be accomplished, for example, by a Fast Fourier Transform algorithm of the type well known in the art. The tendency of tire 40 to translate in the fore-/aft direction as it rolls under load is then specified in terms of one or more of the Fourier coefficients, $U_i$ of the series summation term of equation 3. Each raw coefficient of interest is then corrected by CPU 81 by subtracting an error term derived from calibration as will be explained below. Once so corrected, each coefficient, $U_i$ of interest is displayed by display 114 or used as a control signal to automatically sort or grade tires according to their tendency to translate fore and aft. This is accomplished by comparing each of the coefficients, $U_i$ of interest with corresponding predetermined, specification limits stored in the memory of CPU 81. These specification limits represent empirically determined vibration perception thresholds defined through road testing or mathematical modeling.

Calibration

As described above, tire encoder 60 and loadwheel encoder 65 generate fixed, equal numbers, N, of nominally, evenly, angularly spaced tire and loadwheel encoder pulses 61,66 as well as a single tire reference pulse 62 and loadwheel reference pulse 67 respectively over each rotation. By way of example, it has been assumed N=128.

In an ideal encoder 60,65 each encoder pulse 61,66 would follow the preceding encoder pulse 61,66 by a nominal, angular increment of precisely ($N/2\pi$) radians or, in the case of the example ($128/2\pi$) radians. In a real encoder, however, the angular increment between any two adjacent encoder pulses may differ from the nominal, angular increment. For example, the angular increment between the first and second encoder pulses might be ($129.0/2\pi$) radians. The increment between the eighty-ninth and ninetieth encoder pulses might be ($127.1/2\pi$) radians. The difference between the actual increments and the nominal increments includes errors which may be termed "periodic irregularities", since they will repeat each revolution. The purpose of calibration is to improve accuracy in the determination of effective radius, $R_{Eff}$, by reducing the effect of periodic irregularities in the spacing of encoder pulses 61 and 66.

The software program stored in CPU 81 includes a calibration routine which is performed prior to the testing of tires. Calibration proceeds by first determining the true angular increment, $I(n_L)$, preceding each loadwheel encoder pulse, $n_L$. Once the true angular increments, $I(n_L)$, are determined, angles $A_L(n)$ are computed and stored in the memory of CPU 81 for use in calculating effective radius, $R_{Eff}$, according to the method described above. The increment, $I(n_1)$ and angle, $A_L(n_1)$ respectively of the first loadwheel encoder pulse 66 are measured with respect to the loadwheel reference pulse 67.

Since the tire 40 and loadwheel 52 have different radii $R_{Eff}$ and $R_L$ respectively, it is assumed that their rotation is not synchronized as a ratio of small integers. For this reason, irregularities in the spacing of loadwheel encoder pulses 66 caused by changes in the effective radius, $R_{Eff}$, of tire 40 do not repeat periodically with each revolution of loadwheel 52. On the other hand, periodic irregularities generated by the loadwheel encoder 65 repeat periodically by definition. Over many revolutions of loadwheel 52, all irregularities except periodic irregularities in the spacing of loadwheel encoder pulses 66 tend to average to zero.

The true angle $A_L(n_L)$ between adjacent loadwheel encoder pulses 66 is calculated by CPU 81 by first measuring the time interval between loadwheel encoder pulses 66 by subtracting the time of occurrence, STARTTIME ($I_L$) of the previous loadwheel encoder pulse 66 from the time of occurrence, STOPTIME ($I_L$) of the present loadwheel encoder pulse 66 for each of a large number, $N_{revs}$ of revolutions of loadwheel 52. The angular interval, ANGLE ($I_L$) preceding the $n_L{}^{th}$ loadwheel encoder pulse is calculated and stored by CPU 81 based on the average time interval measured over $N_{revs}$, revolutions, according to the equation:

ANGLE($I_L$) =                     Equation 28

-continued
$$2\pi N_{revs} / \frac{\sum_{revs=1}^{N_{revs}} STOPTIME(I_L) - STARTTIME(I_L)}{N_{revs}}$$

CPU 81 then calculates the angle, $A_L(n_L)$, of each respective loadwheel encoder pulse position, $n_L$ according to:

$$A_L(n_L) = ANGLE(I_L) + ANGLE(I_L+1)$$

where:

Angle ($I_L$) is the angular interval preceding the $n_L{}^{th}$ loadwheel encoder pulse 66 and, Angle ($I_L+1$) is the angular interval preceding the next subsequent loadwheel encoder pulse 66.

Angles $A_L(n_L)$ are stored by CPU 81 in memory and used in calculating $R_{Eff}$ as described above. Once the calibration of the loadwheel encoder 65 is complete, calibration of the tire encoder proceeds as follows.

A tire 40 is mounted upon rim 42 in a first angular position relative to the rotational position of tire encoder 60. CPU then calculates the magnitude, $U_i$ and phase angle, $\phi_i$ of each harmonic of interest by Feurier analysis in the manner previously described and stores this vector information in memory. Phase angle, $\phi_i$ is measured relative to tire reference pulse 62. The same tire 40 is then removed from rim 42 and remounted in a randomly different angular orientation with respect to tire encoder 60. CPU again calculates and stores the magnitude, $U_i$, and phase angle, $\phi_i$, for each harmonic of $R_{Eff}$ of interest.

The above procedure is repeated for a large number of orientations of tire 40. For each harmonic of interest, CPU 81 then calculates a vector average of each of the vectors stored in its memory. Since the tire 40 has been rotated many times in a random fashion with respect to the tire encoder 60, all vector contributions due to changes in the effective radius $R_{Eff}$ of tire 40 tend to average to zero such that tyhe resultant vector average for each harmonic represents an error term which is stored by CPU 81 in its memory. When a tire 40 is tested, the error term is subtracted from the raw computed value of each harmonic of interest before being processed further as described above.

Second Preferred Embodiment

Figure 4:
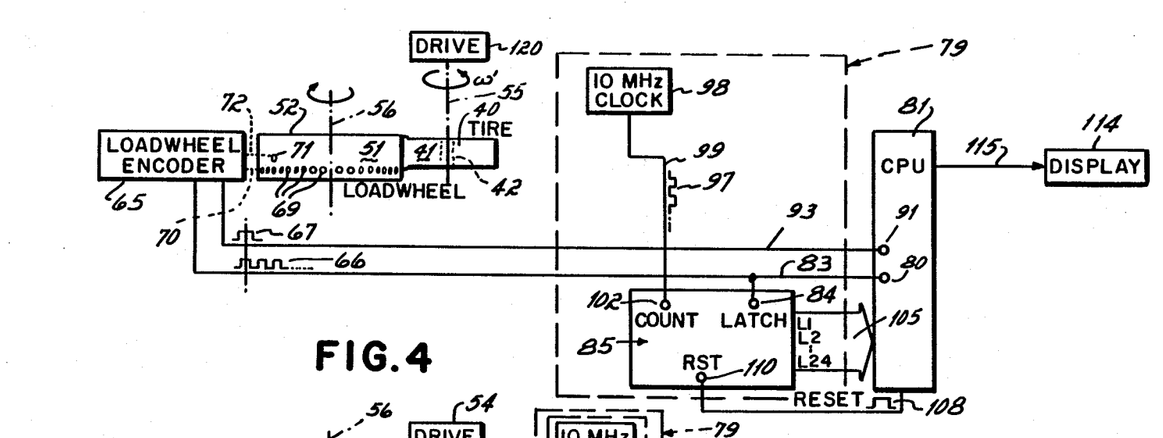
FIG. 4 is a schematic block diagram of the apparatus of a second preferred embodiment of the invention.

A second preferred embodiment of the invention can be further understood with reference to FIG. 4. The second embodiment of FIG. 4 is similar to the first embodiment of FIG. 3 described above, with like numbers representing like structures. However, the embodiments of FIGS. 3 and 4 differ significantly in a number of respects.

First, the drive 120 of FIG. 4 is a precision speed drive which causes tire 40 to rotate at a precisely controlled, constant angular speed, $\omega'$ whereas the drive 54 of FIG. 3, which is typical of most tire uniformity inspection machines, operates at a speed which is only nominally constant. Since $\omega'$ is held constant the apparatus of FIG. 4 does not require the tire encoder 60 and associated first latched counter 77 shown in FIG. 3. Additionally, the software program of CPU 81 differs as will be described below.

As described above and shown in equation 21, the instantaneous speed of the tread surface 41 of tire 40 varies with changes in the effective radius, $R_{Eff}$ of the tire 40. As tire 40 rotates in forced contact with loadwheel 52, these changes in tire tread surface speed are imparted to the circumferential surface 51 of loadwheel 52. Since loadwheel 52 is rigid, it does not deform appreciably. Therefore, induced changes in the speed of its circumferential surface 51 are reflected in corresponding changes in the angular speed of loadwheel 52. With the angular velocity, $\omega'$ of tire 40 held constant, any changes in the angular velocity of loadwheel 52 are due to changes in the effective radius, $R_{Eff}$ of tire. CPU 81 is programmed to measure the angular acceleration of loadwheel 52 according to the timing of pulses 66, 67 emanating from loadwheel encoder 65. CPU 81 then calculates at least one Fourier coefficient of the angular acceleration of the loadwheel to predict fore/aft translations of tire 40 by comparison with empirically determined limits in a manner similar to that described above in connection with the first preferred embodiment.

While the first and second preferred embodiments described herein illustrate the invention, it is to be understood that the invention is not limited to those forms and that changes may be made therein without departing from the scope of the invention as defined by the appended claims.

I claim:

1. A method of testing a tire to predict the tendency of the tire to generate forces in the fore and aft directions when the tire is used, comprising the steps of:
   (a) rotating the tire under a radial load against a loadwheel and,
   (b) measuring changes in the instantaneous effective radius of the tire as the tire rotates.

2. The method of claim 1 wherein the tire is rotated at a speed which is low compared to highway speed.

3. The method of claim 2 wherein the tire is rotated at a speed of about 60 revolutions per minute.

4. A method of testing a tire to predict the tendency of the tire to generate forces in the fore and aft directions when the tire is used, comprising the steps of:
   (a) rotating the tire under a radial load against a loadwheel and,
   (b) measuring at least one parameter selected from the group of parameters consisting of, changes in the instantaneous effective radius, ($R_{Eff}$) of the tire, the acceleration of the tread surface of the tire, the angular acceleration of the tire and the acceleration of said loadwheel relative to the angular acceleration of the tire.

5. The method of claim 4 wherein the tire is rotated at a speed which is low compared to highway speed.

6. The method of claim 5 wherein the tire is rotated at a speed of about 60 revolutions per minute.

7. The method of claim 4 further comprising the steps of:
   (a) computing at least one harmonic of said parameter and,
   (b) predicting the tendency of the tire to translate fore and aft based on the relationship between at least one of said harmonics and at least one of a predetermined limit and others of said harmonics.

8. A method of testing a tire to predict the tendency of the tire to generate forces in the fore and aft directions when the tire is used, comprising the steps of:
   (a) rotating the tire under a radial load against the circumferential surface of a loadwheel;
   (b) measuring the instantaneous speed, ($V_L$) of said circumferential surface of said loadwheel;
   (c) measuring the instantaneous angular speed (S) of the tire and,
   (d) calculating the instantaneous effective radius, $R_{Eff}$ of the tire according to the equation:

$$R_{Eff} = \frac{2\pi V_L}{S}$$

9. A method of determining the fore/aft force generated by a tire as it rotates under load, comprising the steps of:
   (a) rotating the tire under a radial load against a loadwheel;
   (b) measuring at least one parameter selected from the group of parameters consisting of, changes in the instantaneous effective radius, ($R_{Eff}$) of the tire, the acceleration of the tread surface of the tire, the angular acceleration of the tire and the accelerating of the loadwheel relative to the angular acceleration of the tire; and
   (c) computing, based on said measured parameter, the fore/aft force generated by the tire.

10. An apparatus for testing a tire to predict the tendency of the tire to generate forces in the fore and aft directions when the tire is used, comprising:
    means for rotating the tire under a radial load against a loadwheel and,
    means for measuring changes in the instantaneous effective radius of the tire as the tire rotates.

11. An apparatus for testing a tire to predict the tendency of the tire to generate forces in the fore and aft directions when the tire is used, comprising:
    (a) means for rotating the tire under a radial load against a loadwheel and,
    (b) means for measuring at least one parameter selected from the group of parameters consisting of changes in the instantaneous effective radius, ($R_{Eff}$) of the tire, the acceleration of the tread surface of the tire relative to the angular acceleration of the tire and the acceleration of said loadwheel relative to the angular acceleration of the tire.

12. The apparatus of claim 11 further comprising:
    (a) means for computing at least one harmonic of said parameter and,
    (b) means for predicting the tendency of the tire to translate fore and aft based on the relationship between at least one of said harmonics and at least one of a predetermined limit and others of said harmonics.

13. An apparatus for determing the fore/aft force generated by a tire as it rotates under load, comprising:
    (a) rotating the tire under a radial load against a loadwheel;
    (b) measuring at least one parameter selected from the group of parameters consisting of, changes in the instantaneous effective radius, ($R_{Eff}$) of the tire, the acceleration of the tread surface of the tire, the angular acceleration of the tire and the acceleration of the loadwheel relative to the angular acceleration of the tire; and
    (c) computing, based on said measured parameter, the fore/aft force generated by the tire.

14. An apparatus for testing a tire to predict the tendency of the tire to generate forces in the fore and aft directions when the tire is used, comprising:
    (a) means for rotating the tire under a radial load against the circumferential surface of a loadwheel;

(b) means for measuring the instantaneous speed ($V_L$) of said circumferential surface of said loadwheel;

(c) means for measuring the instantaneous angular speed (S) of the tire and, (d) means for calculating the instantaneous effective radius, ($R_{Eff}$) of the tire according to the equation:

$$R_{Eff} = \frac{2\pi V_L}{S}$$

15. An apparatus for testing a tire to predict the tendency of the tire to generate forces in the fore and aft directions when the tire is used, comprising:

(a) a loadwheel;

(b) a drive for rotating the tire against the circumferential surface of said loadwheel under a radial load;

(c) a tire encoder operatively connected to the tire to generate a tire reference pulse and a first predetermined number of substantially equally angularly spaced tire encoder pulses for each complete rotation of the tire;

(d) a loadwheel encoder operatively connected to said loadwheel to generate a loadwheel reference pulse and a second predetermined number of substantially equally angularly spaced loadwheel encoder pulses for each complete rotation of said loadwheel;

(e) a programmed central processing unit;

(f) a first timer operatively connected to said tire encoder and to said central processing unit to cause said central processing unit to determine the time, $T_T(n_T)$ of occurrence of each of said tire encoder pulses following one of said tire reference pulses;

(g) a second timer synchronized with said first timer and operatively connected to said loadwheel encoder and to said central processing unit to cause said central processing unit to determine the time, $T_L(n_L)$ of occurrence of each of said loadwheel encoder pulses following the one of said loadwheel encoder pulses next to occur after the occurrence of said one of said tire reference pulses, said central processing unit being programmed to calculate a parameter correlated to changes in the instantaneous effective radius $R_{Eff}$ of the tire as a measurement of the tendency of the tire to translate fore and aft.

16. The apparatus of claim 15 further comprising: display means operatively connected to said central processing unit to indicate the result of the test.

17. An apparatus for testing a tire to predict the tendency of the tire to generate forces in the fore and aft directions when the tire is used, comprising:

(a) a loadwheel;

(b) a drive for rotating the tire at a substantially constant angular speed against the circumferential surface of said loadwheel under a radial load;

(c) a loadwheel encoder operatively connected to said loadwheel to generate a loadwheel reference pulse and a predetermined number of substantially evenly angularly spaced loadwheel encoder pulses for each complete revolution of said loadwheel;

(d) a programmed central processing unit;

(e) a timer operatively connected to said loadwheel encoder and said central processing unit to cause said central processing unit to determine the time, $T_L(n_L)$ of occurrence of each of said loadwheel encoder pulses following one of said loadwheel reference pulses said central processing unit being programmed to calculate a parameter correlated to changes in the effective radius, $R_{Eff}$ of the tire as a measurement of the tendency of the tire to translate fore and aft.

18. The apparatus of claim 11, wherein said parameter comprises changes in the angular acceleration of the loadwheel.

19. The apparatus of claim 11 further comprising; display means operatively connected to said central processing unit to indicate the result of the test.

20. A method of testing a tire to predict the tendency of the tire to generate forces in the fore and aft directions when the tire is used, comprising the steps of:

(a) rotating the tire under a radial load against the circumferential surface of a loadwheel;

(b) measuring the instantaneous speed, ($V_L$) of said circumferential surface of said loadwheel;

(c) measuring the instantaneous angular speed (S) of the tire;

(d) calculating the instantaneous effective radius, $R_{Eff}$ of the tire according to the equation:

$$R_{Eff} = \frac{2 V_L}{S}, \text{ and}$$

(e) at least one of, sorting and grading the tire, based upon a value correlated to $R_{Eff}$, as an indication of the tendency of the tire to generate forces in the fore and aft directions.

21. An apparatus for testing a tire to predict the tendency of the tire to generate forces in the fore and aft directions when the tire is used, comprising:

(a) means for rotating the tire under a radial load against the circumferential surface of a loadwheel;

(b) means for measuring the instantaneous speed ($V_L$) of said circumferential surface of said loadwheel;

(c) means for measuring the instantaneous angular speed (S) of the tire;

(d) means for calculating the instantaneous effective radius, ($R_{Eff}$) of the tire according to the equation:

$$R_{Eff} = \frac{2 V_L}{S}, \text{ and}$$

(e) means connected to said calculating means for at least one of, sorting and grading the tire based on a value correlated to $R_{Eff}$ as an indication of the tendency of the tire to generate forces in the fore and aft direction.

* * * * *

UNITED STATES PATENT AND TRADEMARK OFFICE
CERTIFICATE OF CORRECTION

PATENT NO. : 4,815,004

DATED : March 21, 1989

INVENTOR(S) : James C. Beebe

It is certified that error appears in the above-identified patent and that said Letters Patent is hereby corrected as shown below:

Col. 6, line 47, "constant" should be --contact--.

Col. 10, line 24, "$n_L$" should be --$n_L^{th}$--.

Col. 11, line 24, --Equation 22-- should be inserted after the equation.

Col. 11, line 38, before "tire" insert --$(n_T+1)^{th}$--.

Col. 12, line 6, "66" should be --65--.

Col. 13, line 55, "66" should be --65--.

Col. 14, line 10, --Equation 29-- should be inserted after the equation.

Col. 14, line 41, "tyhe" should be --the--.

Col. 16, line 18, "accelerating" should be --acceleration--.

Signed and Sealed this

Third Day of November, 1992

Attest:

DOUGLAS B. COMER

*Attesting Officer*     *Acting Commissioner of Patents and Trademarks*